United States Patent
Lin et al.

(10) Patent No.: US 10,612,852 B2
(45) Date of Patent: Apr. 7, 2020

(54) TRANSFORMER SYSTEM AND CONTROL METHOD OF AIR-DRYING DEVICE THEREOF

(71) Applicant: Fortune Electric Co., Ltd., Taoyuan (TW)

(72) Inventors: Chia-Ching Lin, Taoyuan (TW); Ching-Min Chen, Taoyuan (TW)

(73) Assignee: FORTUNE ELECTRIC CO., LTD., Taoyuan (TW)

(*) Notice: Subject to any disclaimer, the term of this patent is extended or adjusted under 35 U.S.C. 154(b) by 172 days.

(21) Appl. No.: 15/867,822

(22) Filed: Jan. 11, 2018

(65) Prior Publication Data

US 2019/0212058 A1 Jul. 11, 2019

(51) Int. Cl.
*B01D 53/04* (2006.01)
*B01D 53/26* (2006.01)
(Continued)

(52) U.S. Cl.
CPC ........ *F26B 25/225* (2013.01); *B01D 53/0438* (2013.01); *B01D 53/0454* (2013.01);
(Continued)

(58) Field of Classification Search
CPC ............ B01D 53/0438; B01D 53/0454; B01D 53/261; B01D 2257/80; B01D 2259/40088; F26B 3/00; F26B 25/225
(Continued)

(56) References Cited

U.S. PATENT DOCUMENTS 2,505,581 A * 4/1950 Unger .................... H01F 27/14
   174/14 R
4,820,316 A * 4/1989 Mizuno .............. B01D 53/0454
   95/132
(Continued)

FOREIGN PATENT DOCUMENTS

| CN | 105374516 A | 3/2016 |
| TW | 563521 B1 * | 12/2016 |
| TW | M558900 U | 4/2018 |

OTHER PUBLICATIONS

Machine-generated English translation fo TW 201724133 A (equivalent of TW 563521 B1), published Jul. 2017.*

*Primary Examiner* — Frank M Lawrence, Jr.
(74) *Attorney, Agent, or Firm* — Li & Cai Intellectual Property (USA) Office

(57) ABSTRACT

Disclosed are a transformer system and a control method of an air-drying device thereof. The air-drying device has a desiccant material stored therein and is connected to a transformer for removing water from an airflow entering the transformer. The control method includes the following steps. The first step is detecting a weight of the desiccant material. The next step is determining whether the weight of the desiccant material reaches a first predetermined weight. The next step is determining whether the transformer is in an air inflow state or an air outflow state, and is conducted when the weight of the desiccant material reaches a first predetermined weight. The last step is heating the desiccant material, and is conducted when the transformer is the air outflow state. Therefore, the lifetime of the transformer can be remarkably extended.

10 Claims, 9 Drawing Sheets

(51) Int. Cl.
*F26B 25/22* (2006.01)
*F26B 3/00* (2006.01)

(52) U.S. Cl.
CPC ........ B01D 53/261 (2013.01); *B01D 2257/80* (2013.01); *B01D 2259/40088* (2013.01); *F26B 3/00* (2013.01)

(58) Field of Classification Search
USPC ............ 95/1, 10, 14, 117, 121, 126; 96/108, 96/109, 111, 112, 143, 146
See application file for complete search history.

(56) References Cited

U.S. PATENT DOCUMENTS

| | | | | |
|---|---|---|---|---|
| 5,215,555 | A * | 6/1993 | Graff | B01D 53/0454 95/1 |
| 5,707,430 | A * | 1/1998 | Hara | B01D 53/04 96/111 |
| 7,833,312 | B2 * | 11/2010 | Viereck | B01D 53/0454 95/10 |
| 2003/0089238 | A1 * | 5/2003 | Viereck | H01F 27/14 96/111 |
| 2005/0103195 | A1 * | 5/2005 | Golner | B01D 53/0415 96/111 |
| 2013/0183894 | A1 * | 7/2013 | Watanabe | B01D 53/261 454/127 |
| 2014/0182452 | A1 * | 7/2014 | Herz | B01D 53/0454 95/14 |

* cited by examiner

TRANSFORMER SYSTEM AND CONTROL METHOD OF AIR-DRYING DEVICE THEREOF

BACKGROUND OF THE INVENTION

1. Field of the Invention

The instant disclosure relates to a drying device, and more particularly to a control method of an air-drying device which can remove water from air and a transformer system utilizing the air-drying device.

2. Description of Related Art

Large scale transformers (e.g., oil immersed transformer) have an increased temperature in operation upon an increase in impedance of wire wound coils. And this would result in the thermal expansion of the electrical insulating oil. To counteract such volume change of the electrical insulating oil in the transformer, an oil reservoir is used to compensate temperature dependent volume variations. However, under wet weather conditions, wet air would easily enter the oil storage tank to worse the oil quality, and thus to reduce the electrical insulation in the transformer. What's worse is the occurrence of transformer burnout or dangerous fire hazards due to electrical insulation failure.

To prevent the quality of the electric insulating oil in the transformer from getting worse, an air-drying device is connected to the gas passage of the oil reservoir. Thus, the desiccant material stored in the air-drying device can absorb water form air to ensure the air streams entering the transformer are dried. Although the maintenance-free air-drying device can restore a saturated state of the desiccant material to a water-absorptive state by heating, but it does not know whether the desiccant material reaches or closes to the saturated state. In addition, when a sudden change in the transformer state occurs, the conventional air-drying devices cannot prevent any water out of the desiccant material from running into the oil reservoir under all circumstances.

SUMMARY OF THE INVENTION

One aspect of the instant disclosure relates to a transformer system and a control method of an air-drying device thereof.

One of the embodiments of the instant disclosure provides a control method of an air-drying device. The air-drying device has a desiccant material stored therein and is connected to a transformer for removing water from an airflow entering the transformer. The control method includes the following steps. The first step is detecting a weight of the desiccant material. The next step is determining whether the weight of the desiccant material reaches a first predetermined weight. The next step is determining whether the transformer is in an air inflow state or an air outflow state, and is conducted when the weight of the desiccant material reaches the first predetermined weight. The last step is heating the desiccant material to remove water absorbed by the desiccant material, and is conducted when the transformer is in the air outflow state.

Another one of the embodiments of the instant disclosure provides a transformer system which includes a transformer and an air-drying device. The air-drying device has an air inlet end and an air outlet end in fluid flow connection with the transformer. The air-drying device includes a device main body, a weight sensor, a heater, and a control unit. The device main body is arranged between the air inlet end and the air outlet end and has a desiccant material for removing water from an airflow entering the transformer. The weight sensor is arranged at the air inlet end for detecting a weight of the desiccant material. The heater is arranged on the device main body for heating the desiccant material. The control unit is electrically coupled to the weight sensor and the heater. The control unit determines whether the weight of the desiccant material reaches a first predetermined weight. If the weight of the desiccant material reaches the first predetermined weight, the control unit further determines whether the transformer is in an air inflow state or an air outflow state. And if the transformer is in the air outflow state, the control unit turns on the heater to remove water absorbed by the desiccant material.

One benefit of the instant disclosure is that: the transformer system and the control method of the air-drying device thereof can prevent any water out of the desiccant material from running into the transformer along with an incoming gas stream to cause transformer failure, thereby extending the lifetime of the transformer. Said benefit can be achieved by the specific control logic as below. Firstly, detect a weight of the desiccant and determine whether the weight of the desiccant reaches a predetermined weight. Next, determine whether the transformer is in an air inflow state or an air outflow state if the weight of the desiccant material reaches the first predetermined weight. Finally, heat the desiccant material to remove water absorbed by the desiccant material if the transformer is in the air outflow state.

To further understand the techniques, means and effects of the instant disclosure, the following detailed descriptions and appended drawings are hereby referred to, such that, and through which, the purposes, features and aspects of the instant disclosure can be thoroughly and concretely appreciated. However, the appended drawings are provided solely for reference and illustration, without any intention to limit the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

DETAILED DESCRIPTION OF THE
PREFERRED EMBODIMENTS

Figure 1:
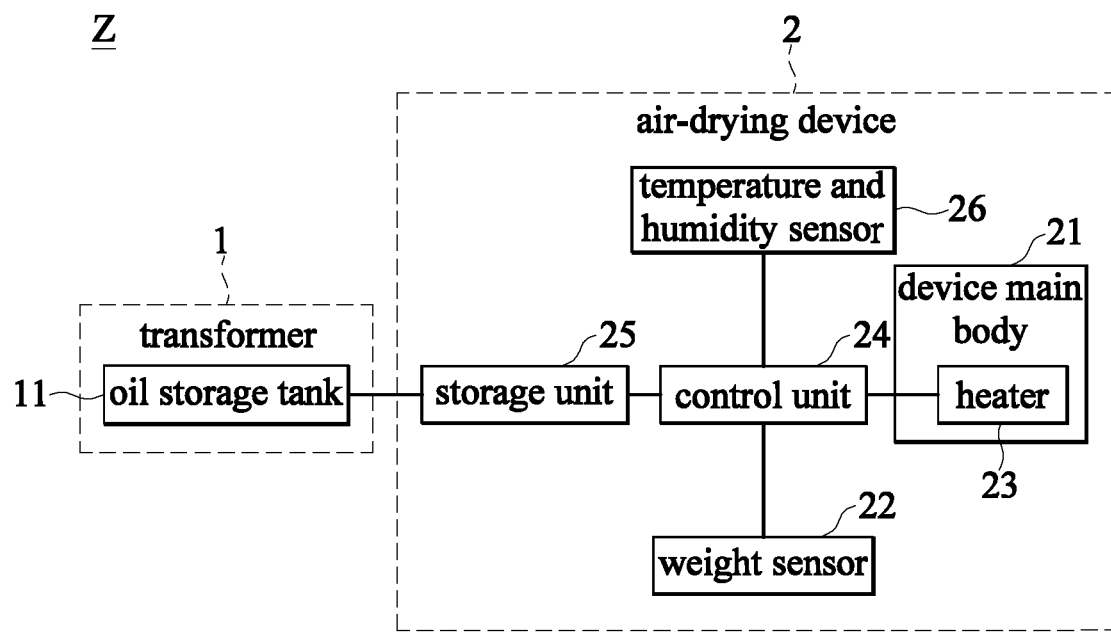
FIG. 1 is a block diagram of the transformer system according to the instant disclosure.
Figure 2:
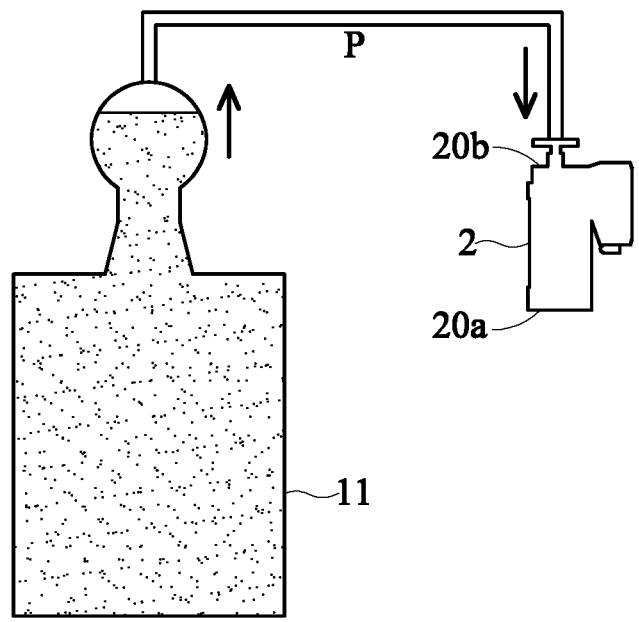
FIG. 2 is a schematic view showing a state of the transformer system according to the instant disclosure.
Figure 3:
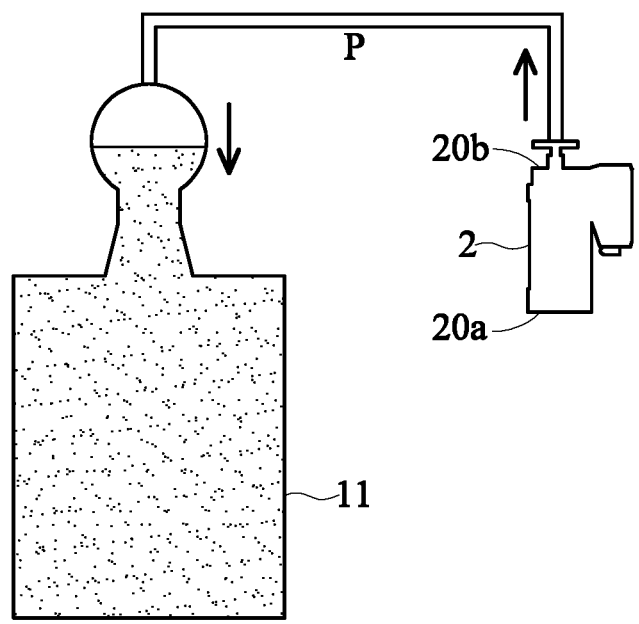
FIG. 3 is a schematic view showing another state of the transformer system according to the instant disclosure.
Figure 4:
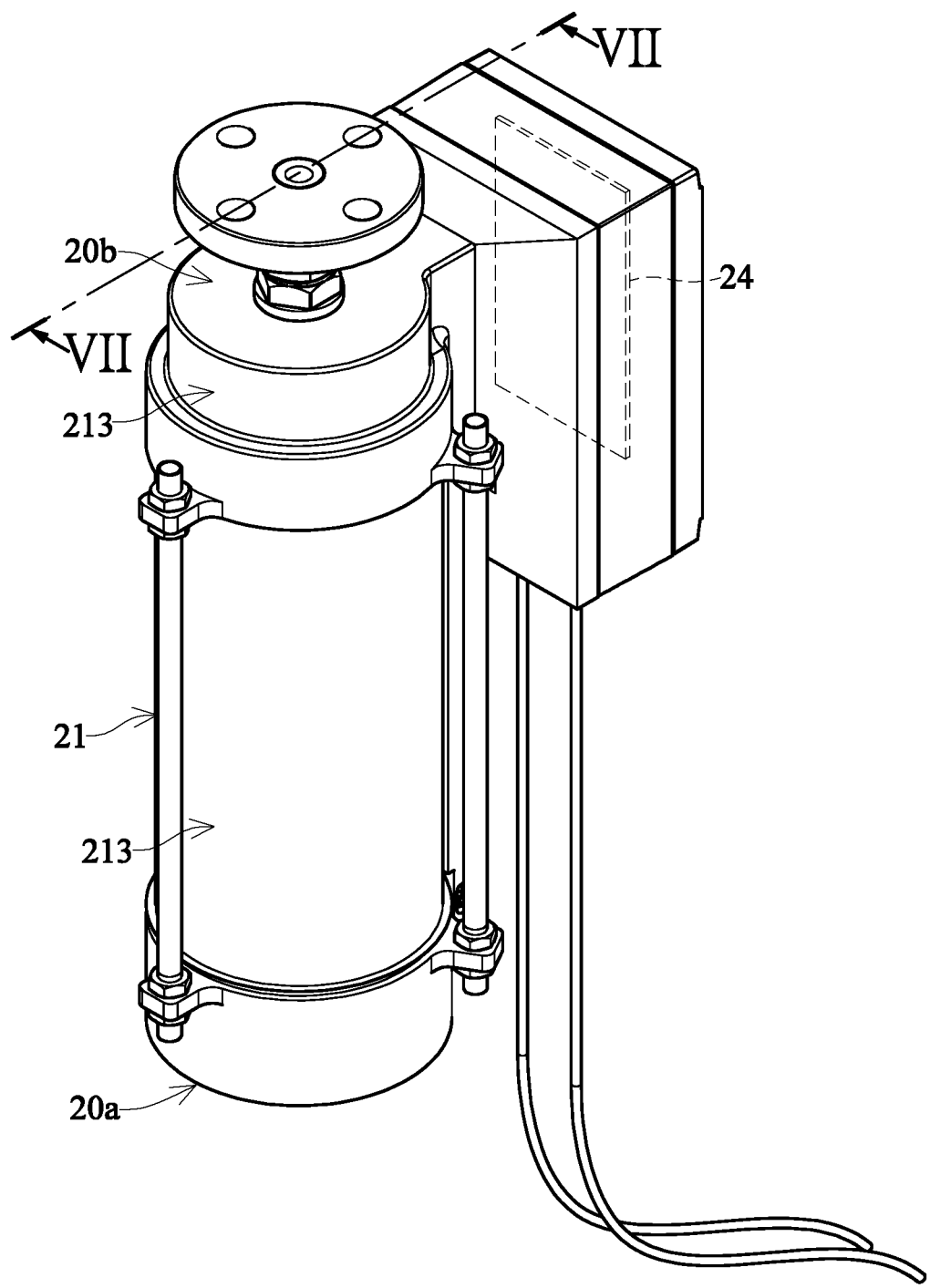
FIG. 4 is a three-dimensional, assembled, schematic view taken from a view angle of the air-drying device of the transformer system according to the instant disclosure.
Figure 5:
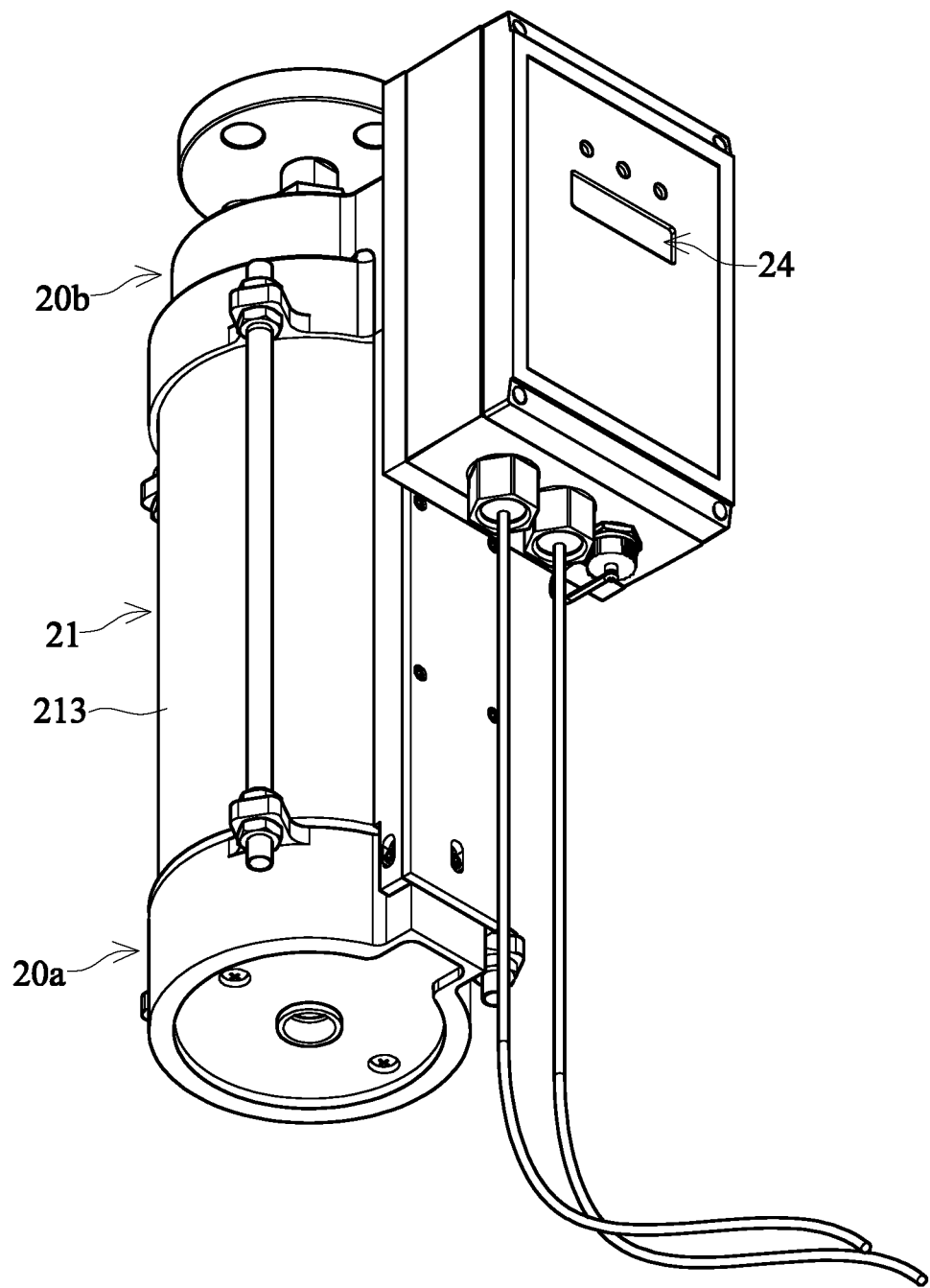
FIG. 5 is a three-dimensional, assembled, schematic view taken from another view angle of the air-drying device of the transformer system according to the instant disclosure.
Figure 6:
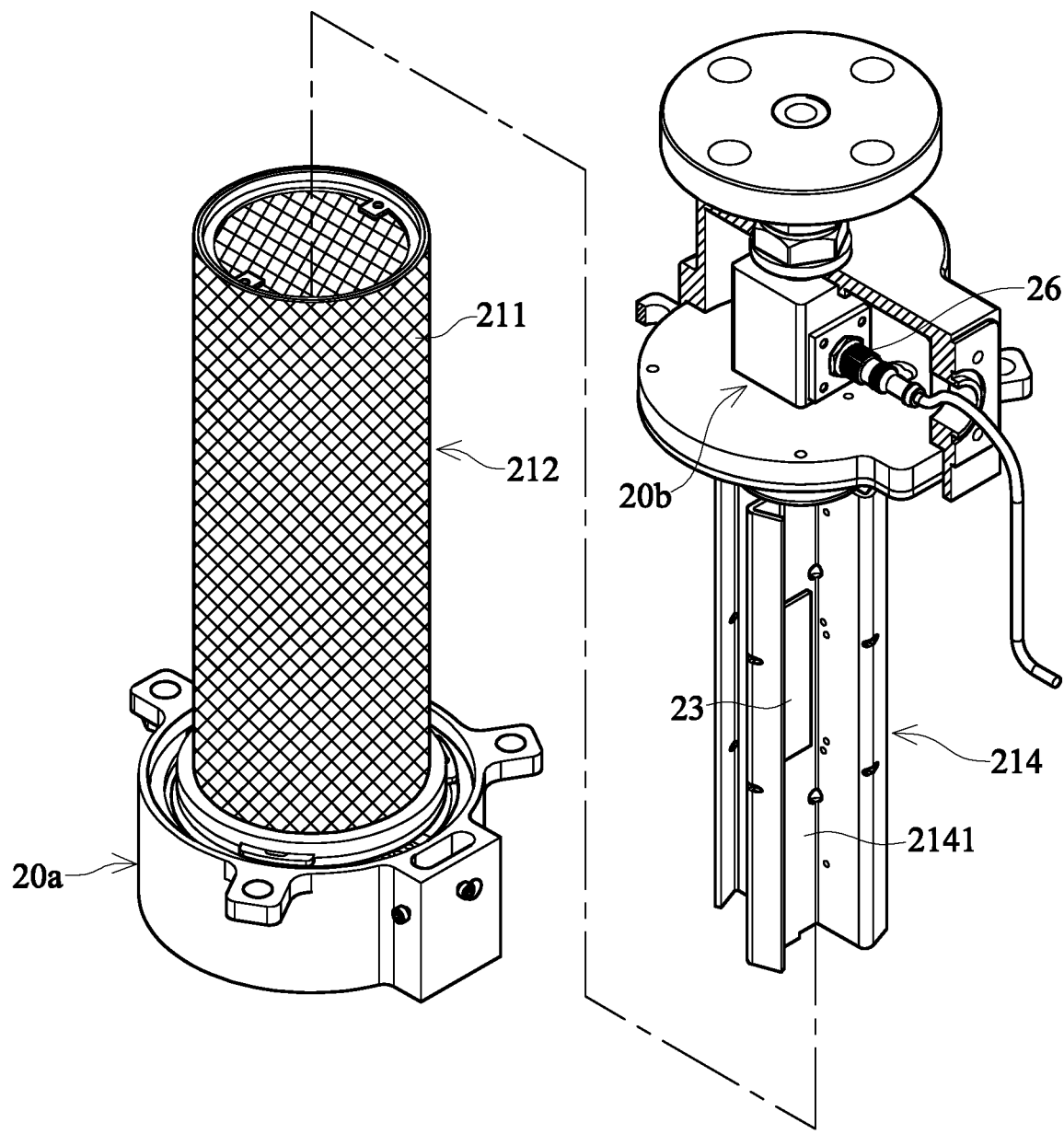
FIG. 6 is a three-dimensional, partially exploded, schematic view of the air-drying device of the transformer system according to the instant disclosure.
Figure 7:
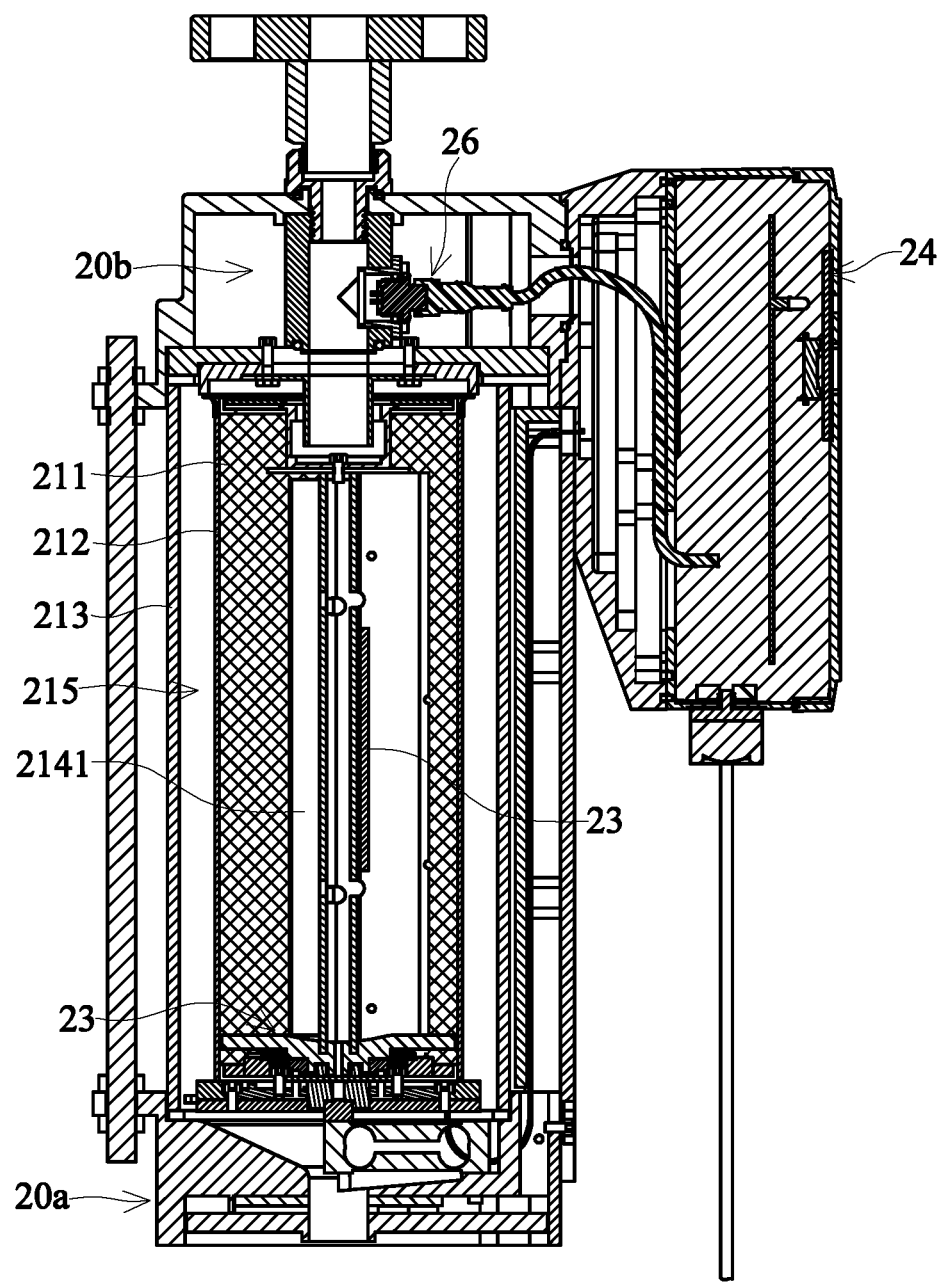
FIG. 7 is a cross-sectional schematic view taken along the cut line VII-VII of FIG. 4.

Please refer to FIGS. 1 to 3. FIG. 1 is a block diagram of the transformer system according to an embodiment of the instant disclosure. FIGS. 2 and 3 are schematic diagrams of the transformer system. The transformer system Z includes a transformer 1 and an air-drying device 2 connected to the transformer 1. The air-drying device 2 has a desiccant material 211 stored therein to absorb water from air. Accordingly, the air streams entering the transformer 1 are dried in operation of the transformer 1 and thereby the lifetime of the transformer 1 can be remarkably extended. For the instant embodiment, the transformer 1 is an oil-immersed transformer and includes an oil storage tank 11. The air-drying device 2 is connected to the oil storage tank 11 by a pipeline P.

The air-drying device 2 mainly includes a device main body 21, a weight sensor 22, a heater 23, and a control unit 24. The air-drying device 2 has an air inlet end 20a and an air outlet end 20b. The pipeline P is connected to the air outlet end 20b such that the air-drying device 2 is in fluid flow connection with the transformer 1. The device main body 21 is arranged between the air inlet end 20a and the air outlet end 20b for storing the desiccant material 211, wherein the desiccant material 211 increases in weight as it absorbs water. The weight sensor 22 is arranged at the air inlet end 20a for detecting a weight of the desiccant material 211. The heater 23 is arranged on the device main body 21 for heating the desiccant material 211. Accordingly, the water absorbed by the desiccant material 211 can be evaporated to ensure the water absorbing ability of the desiccant material 211. The control unit 24 is configured for turning on or turning off the heater 23 according to a specific control logic. Accordingly, the water out of the desiccant material 211 cannot run into an electric insulating oil in the oil storage tank 11, thereby preventing the quality of the electric insulating oil from getting worse. For the instant embodiment, the weight sensor 22 and the heater 23 can be electrically coupled to the control unit 24 in wired and wireless manners. The control unit 24 may be implemented as any kind of processor or programmable circuits.

The following will provide details of the specific control logic. Firstly, the weight sensor 22 detects a weight of the desiccant material 211 and transmits a corresponding weight signal to the control unit 24. Next, the control unit 24 determines whether the weight of the desiccant material reaches a first predetermined weight according to the detected weight signal from the weight sensor 22. There is no particular restriction on the first predetermined weight. The first predetermined weight may be a sum of a reference value and an allowance value. If the weight of the desiccant material 211 reaches the first predetermined weight, the control unit 24 further determines the state of the transformer 1. More specifically, the control unit 24 determines whether the transformer 1 is in an air inflow state or an air outflow state. For the instant embodiment, when the continuously detected weights over a predetermined time interval (e.g., 3 minutes) corresponding to the desiccant material 211 all reach the first predetermined weight, the control unit 24 starts to determine the state of the transformer 1. Accordingly, the misdetermination due to the error-detection signal can be avoided. For example, the detected weight of the weight sensor 22 may be influenced by external environmental factors and thus is higher than the first predetermined weight.

The term "air inflow state," as used herein, means that when the transformer 1 has an increased load, the electric insulating oil thermally expands to increase the oil level and thus to continuously push gas out of the oil storage tank 11. The term "air outflow state," as used herein, means that when the transformer 1 has a decreased load, the electric insulating oil thermally contract to decrease the oil level and thus to allow gas to continuously enter the oil storage tank 11.

If the transformer 1 is in the air outflow state, the control unit 24 turns on the heater 23 to remove water absorbed by the desiccant material. Accordingly, the water absorbency of the desiccant material 211 can be recovered by heating, that is to say, the desiccant material 211 restores its ability of absorbing water from air. There is no particular restriction on the conditions of heating. For example, the desiccant material 211 can be heated at 120° C. for 60 minutes in view of the operating conditions of the transformer 1 and the determination time period of the control unit 24. It should be noted that, when the transformer 1 is in the air outflow state, the gas stream flows unidirectionally and outwardly from the oil storage tank 11. Therefore, the water out of the desiccant material 211 cannot run into the electric insulating oil along with the gas stream, thereby preventing the quality of the electric insulating oil from getting worse.

For the instant embodiment, the control unit 24 determines whether the transformer 1 is in the air outflow state according to a specific temperature raising mode. The control unit 24 determines the transformer 1 is in the air outflow state when the transformer 1 in the specific temperature raising mode is confirmed thereby. More specifically, the air-drying device 2 includes a temperature and humidity sensor 26 which is arranged at the air outlet end 20b and electrically coupled to the control unit 24. However, it should be understood that the present invention is not limited to the arrangement position of the temperature and humidity sensor 26. The temperature and humidity sensor 26 can be arranged at any position that it can detect the temperature of the gas stream discharged from the oil storage tank 11.

The temperature and humidity sensor 26 is configured to periodically detect the temperature of the gas stream discharged from the oil storage tank 11, and thus to obtain a plurality of average temperatures of the electric insulating oil, each of which is taken over a predetermined time interval. For example, the temperature and humidity sensor 26 detects an oil temperature at a time interval of 20 to 26 seconds, and at least ten temperatures which are continuously sensed 10 times can be collected and grouped to a temperature data. Accordingly, plural groups (e.g., ten groups) of temperature data are obtained and each group of temperature data can be used to yield an average temperature.

In the determination time period, the control unit 24 determines whether any one of the average temperatures of the later predetermined time interval is higher than another one of the average temperatures of the earlier time period. And the control unit 24 further determines the difference between the average temperatures of the latest predetermined time interval and the earliest predetermined time interval is higher than or equal to a predetermined temperature difference (e.g., 3° C.). That is to say, the transformer 1 in the specific temperature raising mode is confirmed by the control unit 24 when all the average temperatures of the groups (e.g., ten groups) of temperature data are in an increasing trend, in which the difference between the average temperatures derived from the first and latest detection results is higher than or equal to the predetermined temperature difference. Therefore, the misdetermination due to a sudden change in ambient temperature (e.g., quickly rewarm in the morning) can be avoided.

In practice, the air-drying device 2 can include a storage unit 25 which is electrically coupled to the control unit 24. The storage unit 25 is configured to accept the temperature signals detected by the temperature and humidity sensor 26 and then converted to the corresponding temperature values for storage therein. Thus, the control unit 24 can determine the state of the transformer 1 according to the temperature data from the storage unit 25. For the instant embodiment, the storage unit 25 can be a stationary/movable random access memory (RAM), a read only memory (ROM), a flash memory, or the like, or their combination.

It should be noted that, the transformer system Z has a mechanism for immediately stopping the process of heating the desiccant material 211 to handle a sudden change in flow direction of the gas stream therein. In addition, the generation of unnecessary heat energy can be saved to reduce energy consumption. Once the transformer 1 changes in state from the air outflow state to the air inflow state and thus the flow direction of the gas stream therein changed from inward toward the oil storage tank 11 to outward away from the oil storage tank 11, the control unit 24 can immediately turn off the heater 23. It is emphasized that the state of the transformer 1 may be changed due to external environmental factors in operation. However, the conventional air-drying devices do not have any mechanism for immediately stopping the process of heating the desiccant material.

The above-mentioned mechanism can be implemented by adding a humidity control condition. More specifically, the temperature and humidity sensor 26 can further detect a humidity of a gas stream discharged from the oil storage tank 11 (i.e., the humidity at the air outlet end 20b), and transmit a corresponding humidity signal to the control unit 24. Then, the control unit 24 determines whether the humidity at the air outlet end 20b is higher than a predetermined humidity such as 80 RH % (Relative Humidity). Accordingly, when the gas stream in the system flows inwardly toward the oil storage tank 11 and carries water out of the desiccant material 211, the control unit 24 can turn off the heater 23 to stop the process of heating the desiccant material 211. For the instant embodiment, the water evaporated from the desiccant material 211 would pass through the air outlet end 20b, and thus, a humidity detected by the temperature and humidity sensor 26 is high than the predetermined humidity.

The above-mentioned mechanism can be implemented by adding a weight control condition. More specifically, the weight sensor 22 continuously detect a weight of the desiccant material 211 when the heater is turned on for heating the desiccant material 211 and transmit a corresponding weight signal to the control unit 24. Then, the control unit 24 determines whether the weight of the desiccant material 211 decreases to a second predetermined weight according to the detected weight signal from the weight sensor 22. The first and second predetermined weights may be the same as or different from each other. Accordingly, the desiccant material 211 restores its ability of absorbing water from air since its weight decreases to the second predetermined weight, and the control unit 24 can turn off the heater 23 to stop the process of heating the desiccant material 211.

Please refer to FIGS. 4 to 7. The following will provide details of the device main body 21 and the relative positional relationship between the device main body 21 and the weight sensor 22, heater 23, control unit 24, and the temperature and humidity sensor 26. The device main body 21 mainly includes an inner tube 212, an outer tube 213, and a heat-conducting structure 214. The inner tube 212 has a net body and the desiccant material 211 is incorporated in the net body. The outer tube 213 surrounds the inner tube 212 and a gas-flowing space 215 is formed therebetween. The heat-conducting structure 214 is arranged inside the inner tube 212 and consists of a plurality of heat-conducting plates 2141 for uniformly conducting heat to the desiccant material 211.

The air inlet end 20a is arranged below the device main body 21 and the air outlet end 20b is arranged above the device main body 21. The air inlet end 20a is in flow fluid connection with the external environment via a bottom cover (not numbered) which is mechanically coupled to a bottom portion of the device main body 21. And the weight sensor 22 can be fixed in the bottom cover. The air outlet end 20b is in flow fluid connection with the transformer 1 via a top cover (not numbered) which is mechanically coupled to a top portion of the device main body 21. And the temperature and humidity sensor 26 can be fixed in the top cover. More of the specific details are disclosed in Taiwan Patent No. 1563521.

Figure 8:
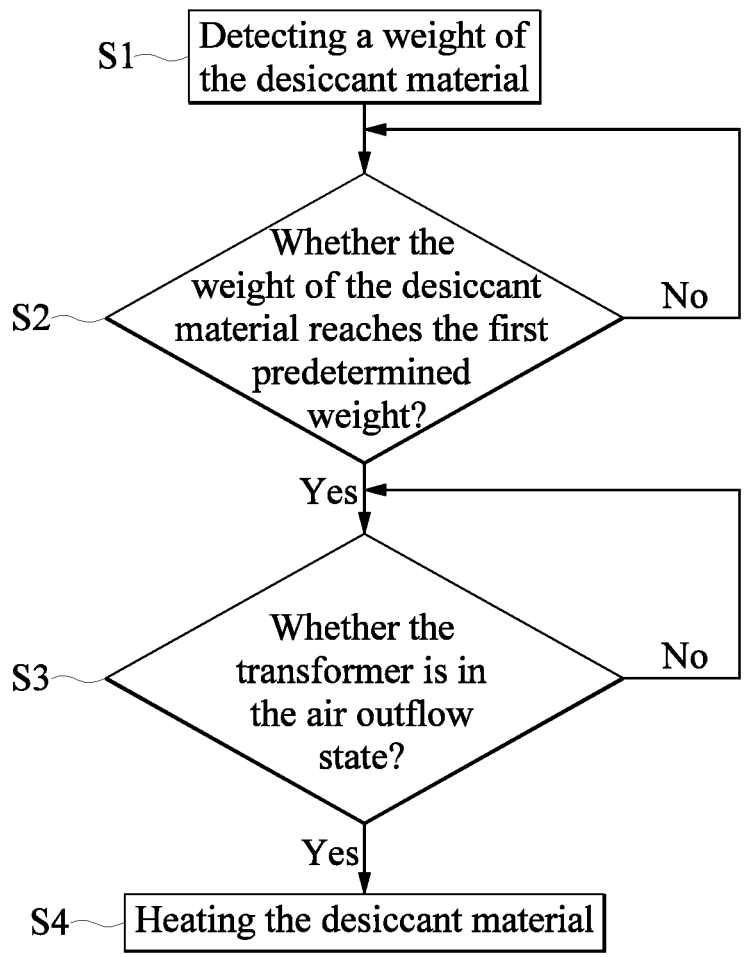
FIG. 8 is a flow diagram of the control method of the air-drying device according to the instant disclosure.

Please refer to FIGS. 8 to 11. The system configuration of the transformer system Z is briefly described as above, and a control method of an air-drying device is further provided. The control method, as shown in FIG. 8, includes the following steps. The step S1 is determining a weight of the desiccant material. The step S2 is determining whether the weight of the desiccant material reaches a first predetermined weight. The step S3 is determining whether the transformer is in an air inflow state or an air outflow state, and is conducted when the weight of the desiccant material reaches the first predetermined weight. The step S4 is heating the desiccant material, and is conducted when the transformer is in the air outflow state.

Figure 9:
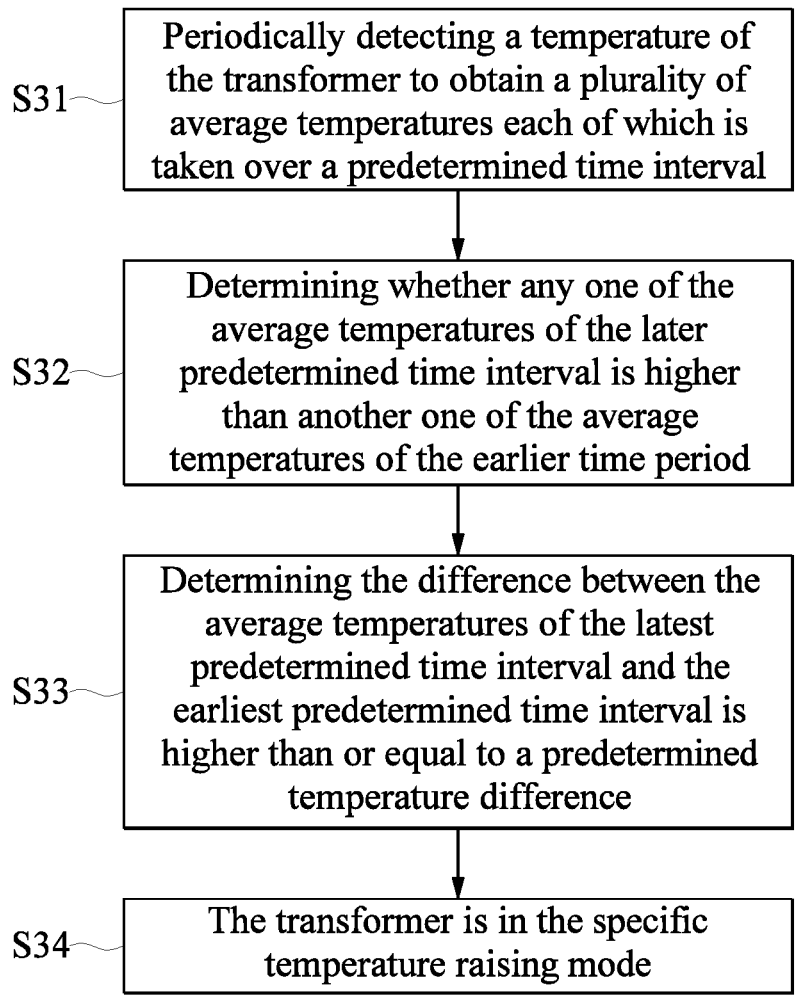
FIG. 9 is a flow diagram of the step S3 of FIG. 8.

Furthermore, in the step S3, the transformer is determined to be in the air outflow state when the transformer is in a specific temperature raising mode. The step S3, as shown in FIG. 9, further includes the following steps. The step S31 is periodically detecting a temperature of the transformer to obtain a plurality of average temperatures each of which is taken over a predetermined time interval. The step S32 is determining whether any one of the average temperatures of the later predetermined time interval is higher than another one of the average temperatures of the earlier predetermined time interval. The step S33 is determining whether the difference between the average temperatures of the latest predetermined time interval and the earliest predetermined time interval is higher than or equal to a predetermined temperature difference. When the above-mentioned temperature conditions are satisfied, the transformer is deemed to be in the air outflow state.

Figure 10:
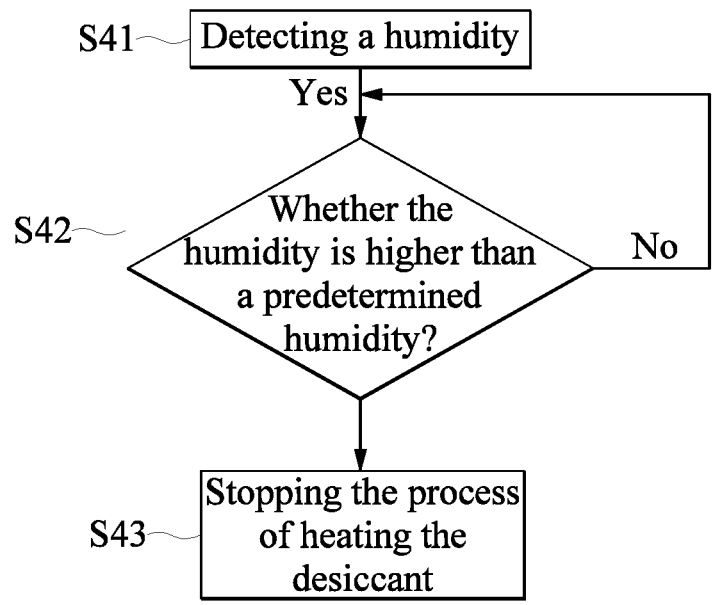
FIG. 10 is a flow diagram of the step S4 of FIG. 8 according to one embodiment.

Furthermore, in the step S4, the mechanism of immediately stopping the process of heating the desiccant material can be implemented by a humidity control condition. The step S4, as shown in FIG. 10, can further include the following steps. The step S41 is detecting a humidity at an air outlet end of the air-drying device. The step S42 is determining whether the humidity at the air outlet end is higher than a predetermined humidity. The step S43 is stopping the process of heating the desiccant material, and is conducted when the humidity at the air outlet end is higher than the predetermined humidity.

Figure 11:
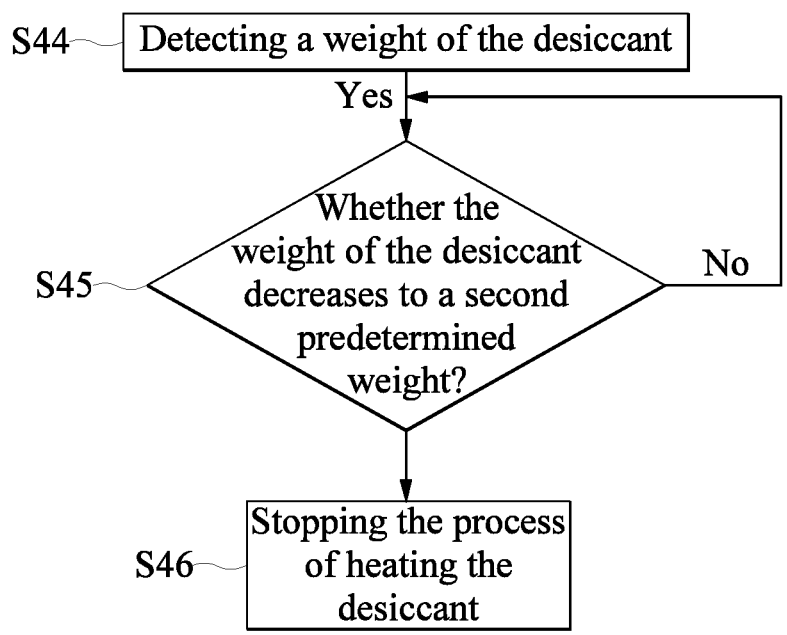
FIG. 11 is a flow diagram of the step S4 of FIG. 8 according to another embodiment.

Furthermore, in the step S4, the mechanism of immediately stopping the process of heating the desiccant material can also be implemented by a weight control condition. The step S4, as shown in FIG. 11, can further include the following steps. The step S44 is detecting a weight of the desiccant material. The step S45 is determining whether the weight of the desiccant material decreases to a second predetermined weight. The step S46 is stopping the process of heating the desiccant material, and is conducted when the weight of the desiccant material decreases to the second predetermined weight.

In practice, the steps in FIGS. 4 to 7 can be implemented as program codes and circuits, but the disclosure is not limited thereto. In other embodiments, other steps can be inserted into the steps in FIGS. 4 to 7.

One benefit of the instant disclosure is that: the transformer system and the control method of the air-drying device thereof can prevent any water out of the desiccant material from running into the transformer along with an incoming gas stream to cause transformer failure, thereby extending the lifetime of the transformer. Said benefit can be achieved by the specific control logic as below. Firstly, detect a weight of the desiccant and determine whether the weight of the desiccant reaches a predetermined weight. Next, determine whether the transformer is in an air inflow state or an air outflow state if the weight of the desiccant material reaches the first predetermined weight. Finally, heat the desiccant material to remove water absorbed by the desiccant material if the transformer is in the air outflow state.

Furthermore, a mechanism can be added to immediately stop the process of heating the desiccant material to handle a sudden change in flow direction of the gas stream therein. And the mechanism can be implemented by adding a humidity control condition or a weight control condition. Therefore, the generation of unnecessary heat energy can be saved to reduce energy consumption.

The aforementioned descriptions merely represent the preferred embodiments of the instant disclosure, without any intention to limit the scope of the instant disclosure which is fully described only within the following claims. Various equivalent changes, alterations or modifications based on the claims of the instant disclosure are all, consequently, viewed as being embraced by the scope of the instant disclosure.

What is claimed is:

1. A control method of an air-drying device, the air-drying device having a desiccant material stored therein and connected to a transformer for removing water from an airflow entering the transformer, the control method comprising:
    detecting a weight of the desiccant material;
    determining whether the weight of the desiccant material reaches a first predetermined weight;
    if the weight of the desiccant material reaches the first predetermined weight, determining whether the transformer is in an air inflow state or an air outflow state; and
    if the transformer is in the air outflow state, heating the desiccant material to remove water absorbed by the desiccant material;
    wherein the step of heating the desiccant material further comprising:
    detecting a humidity at an air outlet end of the air-drying device in fluid flow connection with the transformer;
    determining whether the humidity at the air outlet end is higher than a predetermined humidity; and
    if the humidity at the air outlet end is higher than the predetermined humidity, stopping the process of heating the desiccant material.

2. The control method of claim 1, wherein the step of heating the desiccant material further comprising:
    detecting a weight of the desiccant material;
    determining whether the weight of the desiccant material decreases to a second predetermined weight; and
    if the weight of the desiccant material decreases to the second predetermined weight, stopping the process of heating the desiccant material.

3. The control method of claim 1, wherein when the transformer in a temperature raising mode is confirmed, the transformer is determined to be in the air outflow state.

4. The control method of claim 3, wherein before the step of determining the state of the transformer, further comprising: periodically detecting a temperature of the transformer to obtain a plurality of average temperatures, each of which is taken over a predetermined time interval.

5. The control method of claim 4, wherein when any one of the average temperatures of the later predetermined time interval is higher than another one of the average temperatures of the earlier time period and the difference between the average temperatures of the latest predetermined time interval and the earliest predetermined time interval is higher than or equal to a predetermined temperature difference, the transformer is determined to be in the temperature raising mode.

6. A transformer system, comprising:
    a transformer; and
    an air-drying device having an air inlet end and an air outlet end in fluid flow connection with the transformer, wherein the air-drying device includes:
        a device main body arranged between the air inlet end and the air outlet end, wherein the device main body has a desiccant material for removing water from an airflow entering the transformer;
        a weight sensor arranged at the air inlet end for detecting a weight of the desiccant material;
        a heater arranged on the device main body for heating the desiccant material;
        a temperature and humidity sensor arranged at the air outlet end for detecting a humidity at the air outlet end; and
        a control unit electrically coupled to the weight sensor, the heater and temperature and humidity sensor;
    wherein the control unit determines whether the weight of the desiccant material reaches a first predetermined weight;
    if the weight of the desiccant material reaches the first predetermined weight, the control unit further determines whether the transformer is in an air inflow state or an air outflow state; and
    if the transformer is in the air outflow state, the control unit turns on the heater to remove water absorbed by the desiccant material;
    wherein when the heater is turned on, the control unit determines whether the humidity at the air outlet end is higher than a predetermined humidity; and
    if the humidity at the air outlet end is higher than the predetermined humidity, the control unit turns off the heater.

7. The control method of claim 6, wherein in the process of heating the desiccant material, the weight sensor detects a weight of the desiccant material;

wherein the control unit determines whether the weight of the desiccant material decreases to a second predetermined weight; and wherein if the weight of the desiccant material decreases to the second predetermined weight, the control unit turns off the heater.

8. The control method of claim 6, wherein when the transformer in a temperature raising mode is confirmed by the control unit, the control unit determines the transformer is in the air outflow state.

9. The control method of claim 8, wherein the temperature and humidity sensor further periodically detects a temperature of the transformer to obtain a plurality of average temperatures each of which is taken over a predetermined time interval.

10. The control method of claim 9, wherein when any one of the average temperatures of the later predetermined time interval is higher than another one of the average temperatures of the earlier time period and the difference between the average temperatures of the latest predetermined time interval and the earliest predetermined time interval is higher than or equal to a predetermined temperature difference is confirmed by the control unit, the control unit determines the transformer is in the temperature raising mode.

* * * * *